United States Patent
Huang et al.

(10) Patent No.: US 7,362,672 B2
(45) Date of Patent: *Apr. 22, 2008

(54) METHOD AND APPARATUS FOR DISC ROTATION CONTROL IN AN OPTICAL STORAGE SYSTEM BASED ON DETECTED EXTENT OF DISC WARPING

(75) Inventors: Ping-Kai Huang, Chung-Ho (TW); Cheng-Pin Wang, Chung-Ho (TW)

(73) Assignee: Micro-Star International Co., Ltd., Taiwan (CN)

( * ) Notice: Subject to any disclaimer, the term of this patent is extended or adjusted under 35 U.S.C. 154(b) by 567 days.

This patent is subject to a terminal disclaimer.

(21) Appl. No.: 10/970,863

(22) Filed: Oct. 22, 2004

(65) Prior Publication Data

US 2005/0213454 A1  Sep. 29, 2005

Related U.S. Application Data

(63) Continuation-in-part of application No. 10/889,736, filed on Jul. 13, 2004.

(30) Foreign Application Priority Data

Mar. 26, 2004 (TW) ............................. 93108383 A

(51) Int. Cl.
G11B 7/00 (2006.01)

(52) U.S. Cl. .................. 369/47.44; 369/44.32; 369/53.14

(58) Field of Classification Search .............. 369/44.32
See application file for complete search history.

(56) References Cited

U.S. PATENT DOCUMENTS

| 5,282,192 | A | * | 1/1994 | Yamada et al. | ........... 369/275.4 |
| 5,344,683 | A | * | 9/1994 | Shimizu | ..................... 428/64.4 |
| 6,272,105 | B1 | * | 8/2001 | Hayashi | ................... 369/275.3 |
| 6,295,256 | B1 | * | 9/2001 | Kimikawa et al. | ....... 369/44.32 |
| 2002/0031068 | A1 | * | 3/2002 | Hoeven | ................... 369/47.53 |

* cited by examiner

Primary Examiner—Thang V. Tran
Assistant Examiner—Van T Pham
(74) Attorney, Agent, or Firm—Ladas and Parry LLP

(57) ABSTRACT

An apparatus is provided for disc rotation control in an optical storage system, which is capable of generating a focusing error signal from light that was reflected by a loaded optical disc. The apparatus includes a focus controller for processing the focusing error signal to obtain a focus output signal, a low pass filter unit for processing the focus output signal by low pass filtering to obtain a filtered signal, a direct current level remover for removing a direct current component of the filtered signal to obtain a warp-indicating signal, and a speed controller for comparing the warp-indicating signal with a predetermined threshold value to determine extent of warping of the optical disc. The speed controller is operable to control the optical storage system so as to limit maximum rotation speed of the optical disc according to result of the comparison made by the speed controller.

16 Claims, 7 Drawing Sheets

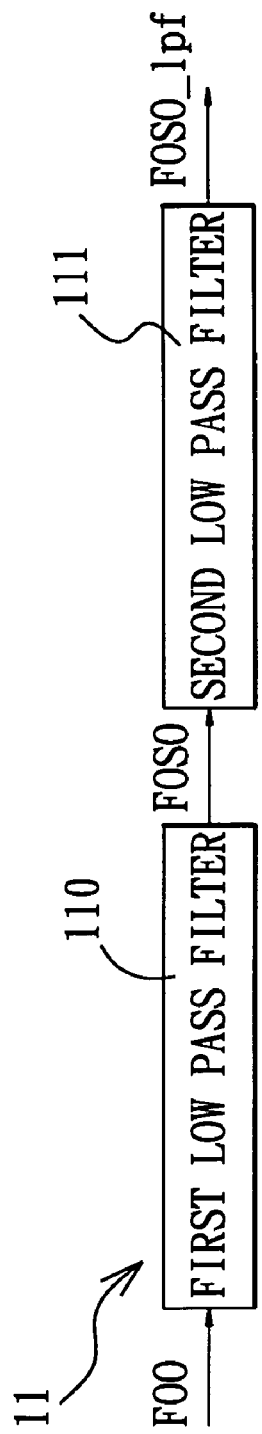
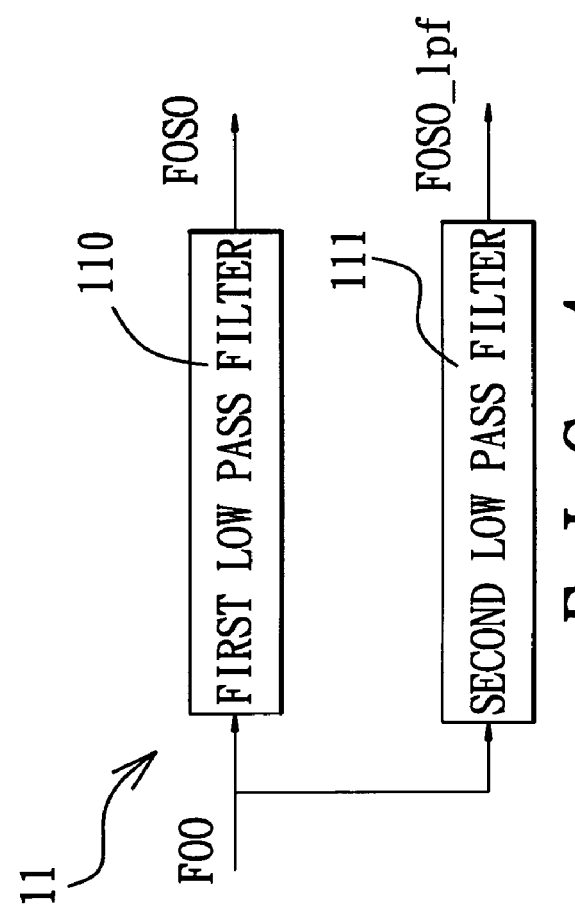
FIG. 3
FIG. 4

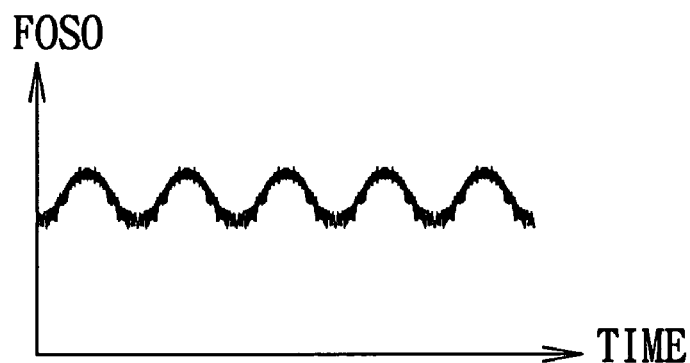
F I G. 7a
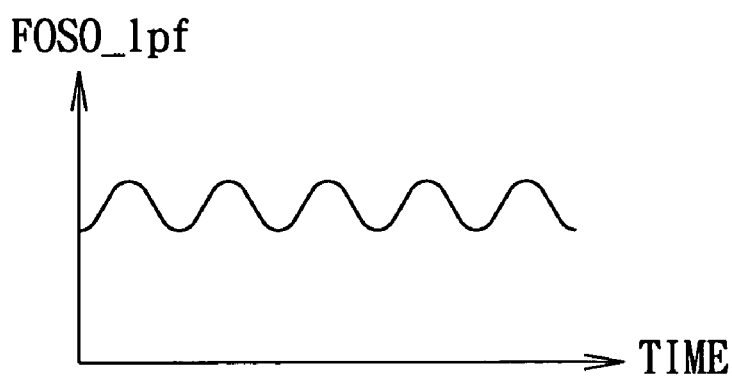
F I G. 7b
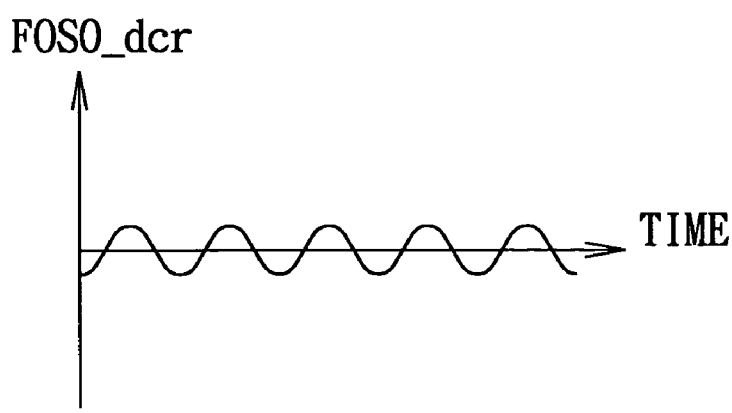
F I G. 7c

METHOD AND APPARATUS FOR DISC ROTATION CONTROL IN AN OPTICAL STORAGE SYSTEM BASED ON DETECTED EXTENT OF DISC WARPING

CROSS-REFERENCE TO RELATED APPLICATIONS

This application claims priority of Taiwanese application no. 093108383, filed on Mar. 26, 2004. This application is also a continuation-in-part (CIP) of U.S. patent application Ser. No. 10/889,736, filed on Jul. 13, 2004.

BACKGROUND OF THE INVENTION

1. Field of the Invention

The invention relates to a method and apparatus for disc rotation control in an optical storage system, more particularly to a method and apparatus for disc rotation control in an optical storage system based on detected extent of disc warping.

2. Description of the Related Art

An optical disc is prone to warp due to numerous factors, such as manufacturing errors, prolonged exposure to humidity or sunlight, applied forces or pressure, etc. As shown in FIG. 1, when loaded on a tray 40 of an optical storage system, a warped optical disc 2 will not lie flat on the tray 40. Hence, due to positional imbalance of the optical disc 2 relative to a rotary axis thereof, a lot of noise and vibrations will be generated during high-speed rotation of the optical disc 2. As a result, the service lives of a spindle motor and the associated servo mechanism of the optical storage system are shortened, and stability of disc recording and playback operations are adversely affected. Moreover, manufacturers are mandated to produce optical storage systems that comply with specified allowable noise and vibration levels during disc recording and playback operations.

In co-pending U.S. patent application Ser. No. 10/889,736, filed on Jul. 13, 2004, the applicants disclosed a digital signal processing device for disc rotation control in an optical storage system, which is capable of generating a focusing error signal from light that was reflected by an optical disc loaded in the optical storage system. The digital signal processing device includes a low pass filter for removing a high-frequency component of the focusing error signal to obtain a filtered signal, a direct current level remover for removing a direct current component of the filtered signal to obtain a warp-indicating signal, and a controller for comparing the warp-indicating signal with a predetermined threshold value to determine extent of warping of the optical disc. The controller functions to control the optical storage system so as to limit maximum rotation speed of the optical disc according to result of the comparison made by the controller.

The entire disclosure of the aforesaid co-pending U.S. Patent application is incorporated herein by reference.

SUMMARY OF THE INVENTION

The object of the present invention is to provide a method and apparatus for disc rotation control in an optical storage system based on detected extent of disc warping so as to overcome the aforesaid drawbacks of the prior art.

According to one aspect of the present invention, there is provided a method for disc rotation control in an optical storage system, which is capable of generating a focusing error signal from light that was reflected by an optical disc loaded in the optical storage system. The method comprises the steps of:

a) processing the focusing error signal to obtain a focus output signal;

b) processing the focus output signal by low pass filtering to obtain a filtered signal;

c) removing a direct current component of the filtered signal to obtain a warp-indicating signal;

d) comparing the warp-indicating signal with a predetermined threshold value to determine extent of warping of the optical disc; and e) controlling the optical storage system so as to limit maximum rotation speed of the optical disc according to result of the comparison made in step d).

According to another aspect of the present invention, there is provided an apparatus adapted for use in an optical storage system for disc rotation control. The optical storage system is capable of generating a focusing error signal from light that was reflected by an optical disc loaded in the optical storage system. The apparatus comprises a focus controller, a low pass filter unit, a direct current level remover, and a speed controller. The focus controller is adapted for processing the focusing error signal to obtain a focus output signal. The low pass filter unit is coupled to the focus controller, and processes the focus output signal by low pass filtering to obtain a filtered signal. The direct current level remover is coupled to the low pass filter unit, and removes a direct current component of the filtered signal to obtain a warp-indicating signal. The speed controller is coupled to the direct current level remover, compares the warp-indicating signal with a predetermined threshold value to determine extent of warping of the optical disc, and controls the optical storage system so as to limit maximum rotation speed of the optical disc according to result of the comparison made by the speed controller.

BRIEF DESCRIPTION OF THE DRAWINGS

Other features and advantages of the present invention will become apparent in the following detailed description of the preferred embodiments with reference to the accompanying drawings, of which:

FIG. 3 is a schematic block diagram to illustrate one preferred implementation of a low pass filter unit of the first preferred embodiment;

FIG. 4 is a schematic block diagram to illustrate another preferred implementation of the low pass filter unit of the first preferred embodiment;

FIGS. 7a to 7c illustrate an exemplary focusing control signal, a filtered signal obtained from the focusing control signal, and a warp-indicating signal obtained from the filtered signal, respectively.

DETAILED DESCRIPTION OF THE PREFERRED EMBODIMENTS

Figure 1:
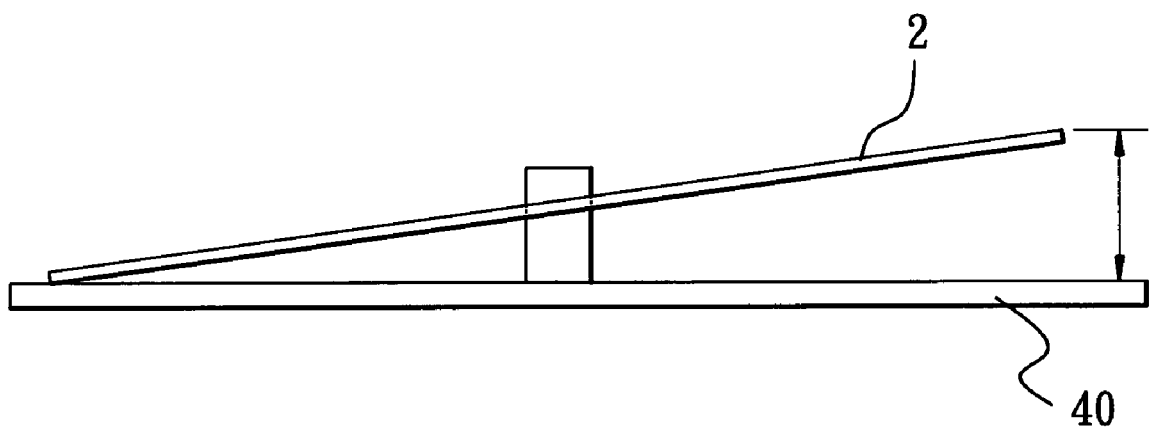
FIG. 1 is a schematic diagram illustrating a warped optical disc loaded on a tray of an optical storage system.
Figure 2:
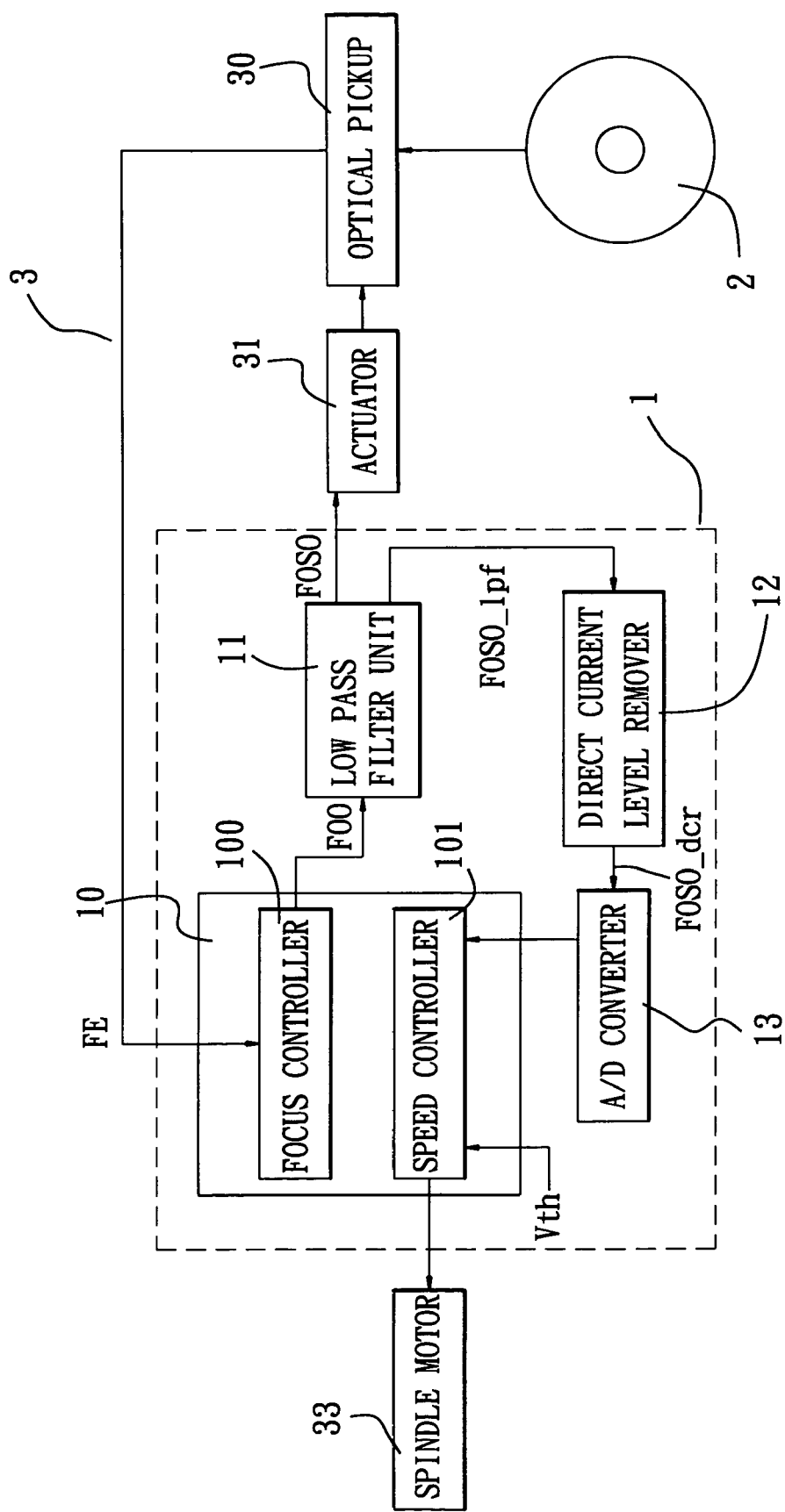
FIG. 2 is a schematic block diagram to illustrate the first preferred embodiment of an apparatus for disc rotation control according to the present invention, together with an optical pickup, an actuator for focus adjustment, and a spindle motor of an optical storage system.

Referring to FIG. 2, the first preferred embodiment of an apparatus 1 for disc rotation control according to the present invention is shown to be coupled to an optical pickup 30, an actuator 31 for focus adjustment, and a spindle motor 33 of an optical storage system 3. The apparatus 1 enables control of the rotation speed of an optical disc 2 based on detected extent of warping of the optical disc 2.

Figure 5:
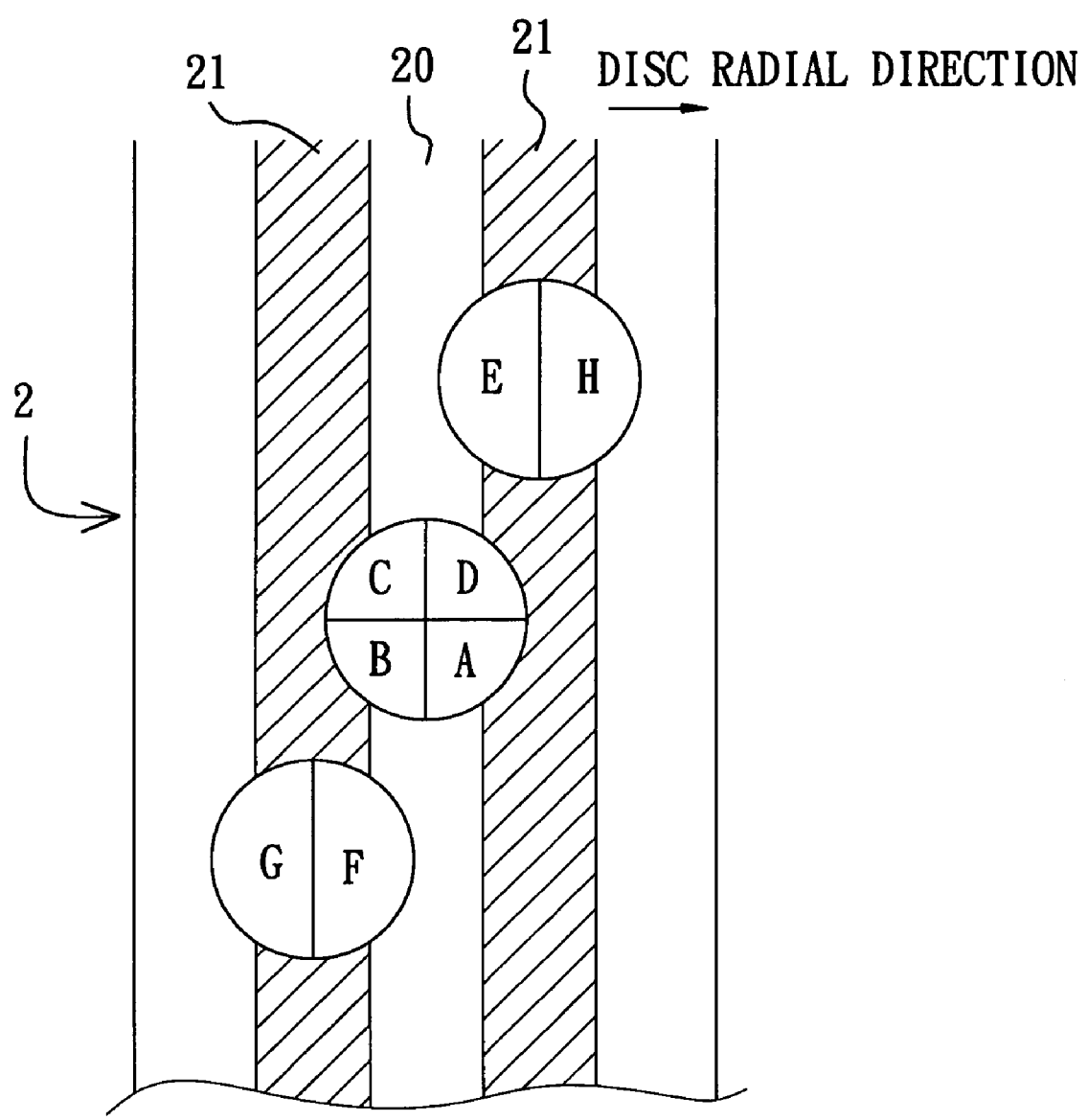
FIG. 5 is a schematic diagram to illustrate how a focusing error signal is generated in a conventional manner.

The optical pickup 30, which is conventional in construction, includes a photo detector that has light beam detecting components (A), (B), (C), (D), (E), (F), (G), (H) positioned and operating in relation to land regions 21 and pit regions 20 on the optical disc 2, as best shown in FIG. 5. Particularly, when the light beam detecting components (A), (B), (C), (D) detect a pit region 20 of the optical disc 2, the light beam detecting components (E), (F) detect the same pit region 20, whereas the light beam detecting components (G), (H) detect the adjacent land regions 21. The sum (A+B+C+D) of light detected by the light beam detecting components (A), (B), (C), (D) is commonly referred to as a main beam, and the focusing error (FE) signal is the result of (A+C)−(B+D).

The apparatus 1 of this embodiment includes a digital signal processor 10 that is configured with a focus controller 100 and a speed controller 101 by writing appropriate firmware into the digital signal processor 10. The FE signal generated by the optical pickup 30 is provided to the focus controller 100. The focus controller 100 generates a focus output (FOO) signal, which is a pulse-width modulated signal, in response to the FE signal in a conventional manner. The apparatus 1 of this embodiment further includes a low pass filter unit 11 that is coupled to the digital signal processor 10, that receives the FOO signal from the focus controller 100, and that processes the FOO signal to result in a focus control (FOSO) signal. The FOSO signal is provided to the actuator 31 of the optical storage system 3, thereby enabling the actuator 31 to adjust focusing of the optical pickup 30 in a known manner. The FE and FOSO signals generated for a normal optical disc 2 under focused conditions are direct current signals having fixed levels. However, when the optical disc 2 is warped, the FE and FOSO signals generated under focused conditions will not have fixed levels, and will instead vary in a sinusoidal manner.

The apparatus 1 of this embodiment is adapted for detecting the extent of warping of the optical disc 2, and for controlling the spindle motor 33 to limit the rotation speed of the optical disc 2 accordingly. As shown in FIG. 2, the apparatus 1 of this embodiment includes the digital signal processor 10 configured with the focus controller 100 and the speed controller 101, the low pass filter unit 11, a direct current (DC) level remover 12, and an analog-to-digital (A/D) converter 13.

The focus controller 100 of the digital signal processor 10 receives the FE signal from the optical pickup 30, and generates the FOO signal in accordance with the FE signal in a conventional manner.

The low pass filter unit 11 is coupled to the digital signal processor 10, receives the FOO signal from the focus controller 100, and generates the FOSO signal (see FIG. 7a) that is provided to the actuator 31 for focusing adjustment of the optical pickup 30 in a conventional manner. The low pass filter unit 11 further generates a filtered signal (FOSO_lpf) (see FIG. 7b).

Referring to FIG. 3, in one preferred implementation of the low pass filter unit 11, the low pass filter unit 11 includes a first low pass filter 110 that receives the FOO signal from the focus controller 100 and that processes the FOO signal to result in the FOSO signal to be provided to the actuator 31. The low pass filter unit 11 further includes a second low pass filter 111 that receives the FOSO signal from the first low pass filter 110 and that removes a high-frequency noise component of the FOSO signal to result in the filtered signal (FOSO_lpf).

Referring to FIG. 4, in another preferred implementation of the low pass filter unit 11, the low pass filter unit 11 includes a first low pass filter 110 that receives the FOO signal from the focus controller 100 and that processes the FOO signal to result in the FOSO signal to be provided to the actuator 31. The low pass filter unit 11 further includes a second low pass filter 111 that also receives the FOO signal from the focus controller 100 and that processes the FOO signal to result in the filtered signal (FOSO_lpf), which corresponds to the FOSO signal after being subjected to low pass filtering to remove a high-frequency noise component thereof.

Referring again to FIG. 2, the DC level remover 12 is coupled to the low pass filter unit 11, and is used to remove a DC component of the filtered signal (FOSO_lpf) to obtain a warp-indicating signal (FOSO_dcr) (see FIG. 7c).

The A/D converter 13 is coupled to the DC level remover 12, and converts the warp-indicating signal (FOSO_dcr) into digital form.

The speed controller 101 of the digital signal processor 10 is coupled to the A/D converter 13, and compares the digitized warp-indicating signal (FOSO_dcr) from the A/D converter 13 with a predetermined threshold value (Vth) to determine extent of warping of the optical disc 2. The speed controller 101 then controls the spindle motor 33 so as to limit the maximum rotation speed of the optical disc 2 according to result of the comparison made by the speed controller 101.

Figure 6:
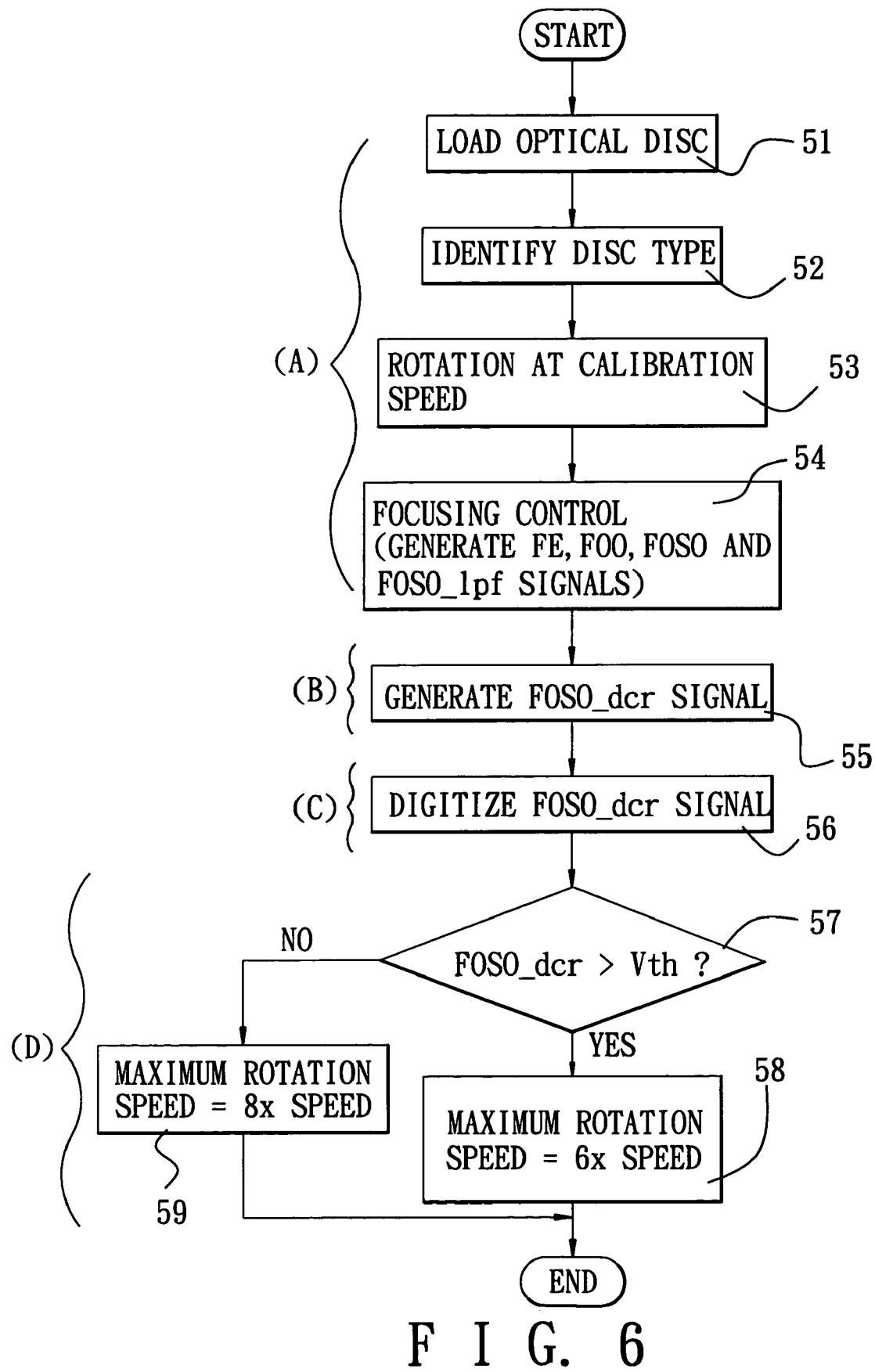
FIG. 6 is a flowchart illustrating the preferred embodiment of a method for disc rotation control in an optical storage system according to the present invention.

Referring to FIG. 6, the preferred embodiment of a method for disc rotation control in the optical storage system 3 according to the present invention is shown to include the following stages:

Stage (A): In step 51, the optical disc 2 is loaded in the optical storage system 3. In step 52, the optical storage system 3 identifies the type of the optical disc 2 (e.g., ROM/−R/−RW/+R/+RW/RAM), and proceeds with corresponding servo control in a manner well known in the art. Then, in step 53, the optical storage system 3 is operated such that the spindle motor 33 drives the optical disc 2 to rotate at a preset low calibration speed (for instance, 4× speed), and focusing control is subsequently performed in step 54. At this moment, the FE signal is generated from the outputs of the light beam detecting components (A), (B), (C), (D) in a known manner as described hereinabove. The focus controller 100 generates the FOO signal in response to the FE signal received from the optical pickup 30, and the low pass filter unit 11 generates the FOSO signal (see FIG. 7a) and the filtered signal (FOSO_lpf) (see FIG. 7b) in response to the FOO signal from the focus controller 100. The FOSO signal is provided to the actuator 31 for focusing adjustment of the optical pickup 30 in a conventional manner. In this embodiment, the cut-off frequency of the second low pass filter 111 is chosen to correspond with the preset low calibration speed. For example, when the calibration speed is set to 4× speed, the actual speed of the spindle motor 33 is 2400 RPM (=40 Hz), and the cut-off frequency of the second low pass filter 111 is thus chosen to be about 40 Hz.

Stage (B): In step 55, the filtered signal (FOSO_lpf) is processed by the DC level remover 12 so as to obtain the warp-indicating signal (FOSO_dcr). As shown in FIG. 7c, only the alternating current component of the filtered signal (FOSO_lpf) remains in the warp-indicating signal (FOSO_dcr).

Stage (C): In step 56, the warp-indicating signal (FOSO_dcr) is digitized by the A/D converter 13 before being provided to the speed controller 101 of the digital signal processor 10.

Stage (D): In step 57, the speed controller 101 receives the digitized warp-indicating signal (FOSO_dcr) from the A/D converter 13, and compares the same with a predetermined threshold value (Vth) to determine extent of warping of the optical disc 2. In this embodiment, the predetermined threshold value (Vth) is obtained from the focus controller 100 of the digital signal processor 10, the low pass filter unit 11, the DC level remover 12 and the A/D converter 13 by conducting the aforesaid Stages (A) to (C) using a reference optical disc 2 having a predetermined extent of warping (for instance, 1.0 mm). In step 57, if the amplitude of the digitized warp-indicating signal (FOSO_dcr) is larger than the predetermined threshold value (Vth), the speed controller 101 deems the optical disc 2 to be a warped disc, and the flow goes to step 58. Otherwise, the speed controller 101 deems the optical disc 2 to be a normal disc (i.e., the extent of disc warping is within a tolerable range), and the flow goes to step 59.

In step 58, in response to a command for increasing the motor speed, the speed controller 101 controls the spindle motor 33 of the optical storage system 3 to limit the maximum rotation speed of the optical disc 2 (for instance, the maximum rotation speed is limited to 6× speed instead of an allowable maximum operating speed of 8× speed).

In step 59, in response to the command for increasing the motor speed, the speed controller 101 controls the spindle motor 33 to rotate the optical disc 2 at the allowable maximum operating speed of 8× speed.

Figure 8:
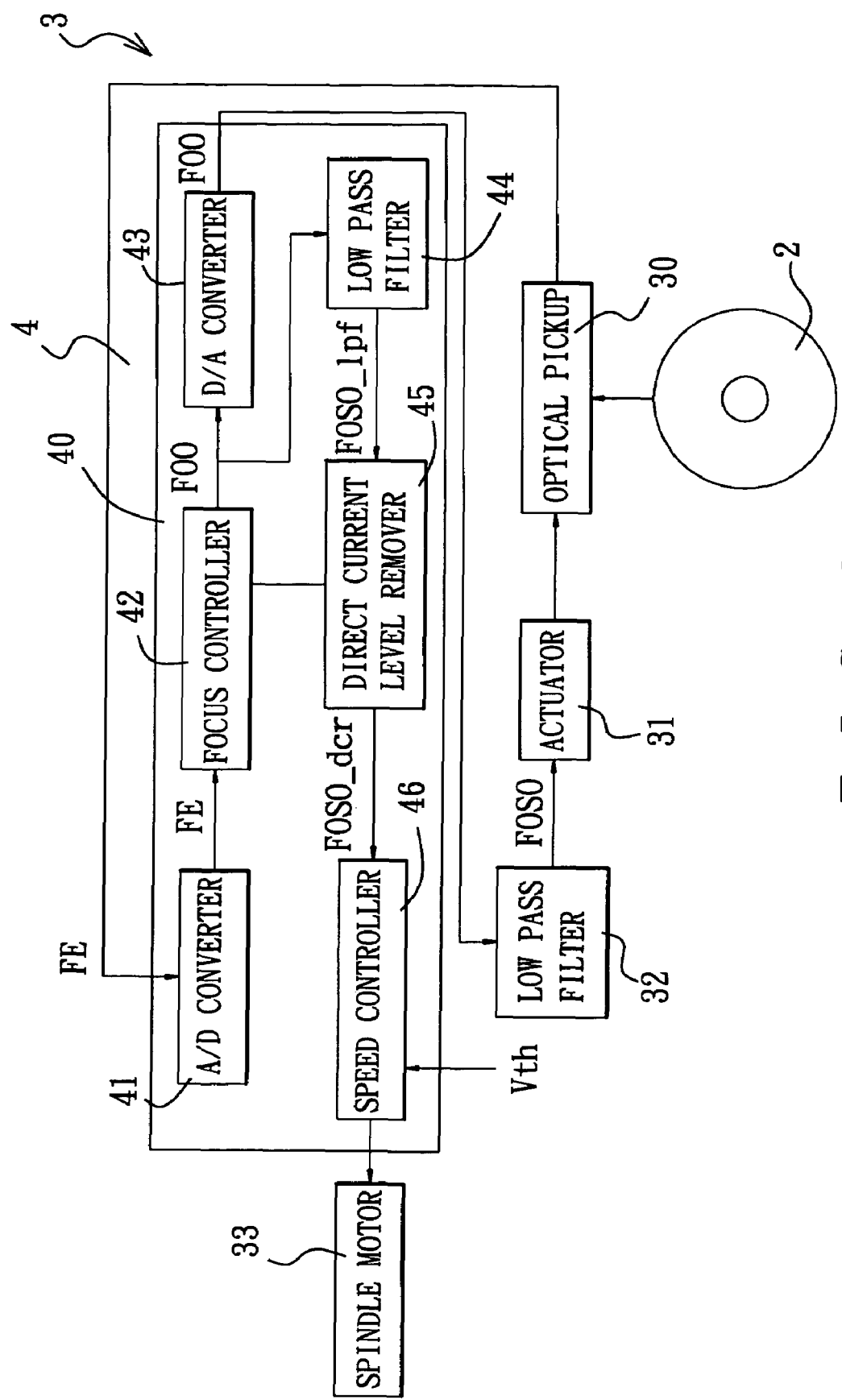
FIG. 8 is a schematic block diagram to illustrate the second preferred embodiment of an apparatus for disc rotation control according to the present invention.

FIG. 8 illustrates the second preferred embodiment of an apparatus 4 for disc rotation control according to the present invention. The apparatus 4 of this embodiment includes a digital signal processor 40 that is configured with an analog-to-digital (A/D) converter 41, a focus controller 42, a digital-to-analog (D/A) converter 43, a low pass filter 44, a direct current (DC) level remover 45, and a speed controller 46 by writing appropriate firmware into the digital signal processor 40.

In use, the A/D converter 41 receives the analog FE signal generated by the optical pickup 30 of the optical storage system 3, and generates a digitized FE signal. The focus controller 42 receives the digitized FE signal from the A/D converter 41, and generates a digital FOO signal that corresponds to the digitized FE signal. The D/A converter 43 receives the digital FOO signal from the focus controller 42, and generates an analog FOO signal. Unlike the optical storage system 3 of FIG. 2, a low pass filter 32 is disposed externally of the digital signal processor 40, and processes the analog FOO signal to result in a FOSO signal that is provided to the actuator 31 for focusing adjustment of the optical pickup 30.

The low pass filter 44 of the digital signal processor 40 receives the digital FOO signal from the focus controller 42, and processes the same by low pass filtering to result in a digital filtered signal (FOSO_lpf). The DC level remover 45 receives the digital filtered signal (FOSO_lpf), and processes the same in a manner similar to the previous embodiment to result in a digital warp-indicating signal (FOSO_dcr). The speed controller 46 receives the warp-indicating signal (FOSO_dcr) from the DC level remover 45, and compares the digital warp-indicating signal (FOSO_dcr) with a predetermined threshold value (Vth) to determine extent of warping of the optical disc 2. Then, like the previous embodiment, the speed controller 46 controls the spindle motor 33 so as to limit the maximum rotation speed of the optical disc 2 according to result of the comparison made by the speed controller 46.

In sum, by generating the warp-indicating signal (FOSO_dcr) from the FOO signal for subsequent comparison with a predetermined threshold value (Vth) to determine the extent of warping of the optical disc 2, and by limiting the maximum rotation speed of the optical disc 2 according to the result of the comparison, disc rotation control as proposed in the present invention makes it possible to reduce noise and vibrations to acceptable levels, prolong the service lives of the spindle motor 33 and the associated servo mechanism of the optical storage system 3, and improve stability of the disc recording and playback operations.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A method for disc rotation control in an optical storage system, the optical storage system being capable of generating a focusing error signal from light that was reflected by an optical disc loaded in the optical storage system, said method comprising the steps of:
   a) processing the focusing error signal to obtain a focus output signal;
   b) processing the focus output signal by low pass filtering to obtain a filtered signal;
   c) removing a direct current component of the filtered signal to obtain a warp-indicating signal;
   d) comparing the warp-indicating signal with a predetermined threshold value to determine extent of warping of the optical disc; and
   e) controlling the optical storage system so as to limit maximum rotation speed of the optical disc according to result of the comparison made in step d).

2. The method of claim 1, wherein the focusing error signal processed in step a) is generated while the optical storage system rotates the optical disc at a low speed.

3. The method of claim 1, wherein the filtered signal obtained in step b) corresponds to a focus control signal for focusing adjustment in the optical storage system and filtered to remove a high-frequency component thereof.

4. The method of claim 1, wherein step b) includes:
   b1) processing the focus output signal to result in a focus control signal suitable for focusing adjustment in the optical storage system; and
   b2) removing a high-frequency component of the focus control signal to obtain the filtered signal.

5. The method of claim 4, wherein, in step b2), the high-frequency component is removed using a low pass filter having a cut-off frequency that is dependent upon rotation speed of a spindle motor of the optical storage system.

6. The method of claim 1, wherein:
   in step d), the optical disc is deemed to be a warped disc when the amplitude of the warp-indicating signal is larger than the predetermined threshold value; and
   in step e), the optical storage system is controlled so as to limit the maximum rotation speed of the optical disc when the optical disc is determined to be a warped disc in step d).

7. The method of claim 1, wherein, in step d), the predetermined threshold value is obtained by performing steps a), b) and c) using a reference optical disc having a predetermined extent of warping.

8. An apparatus adapted for use in an optical storage system for disc rotation control, the optical storage system being capable of generating a focusing error signal from light that was reflected by an optical disc loaded in the optical storage system, said apparatus comprising:
   a focus controller adapted for processing the focusing error signal to obtain a focus output signal;
   a low pass filter unit coupled to said focus controller for processing the focus output signal by low pass filtering to obtain a filtered signal;
   a direct current level remover coupled to said low pass filter unit for removing a direct current component of the filtered signal to obtain a warp-indicating signal; and
   a speed controller coupled to said direct current level remover for comparing the warp-indicating signal with a predetermined threshold value to determine extent of warping of the optical disc;
   said speed controller being adapted to control the optical storage system so as to limit maximum rotation speed of the optical disc according to result of the comparison made by said speed controller.

9. The apparatus of claim 8, wherein said focus controller is adapted to receive the focusing error signal from an optical pickup of the optical storage system while the optical storage system is operated to rotate the optical disc at a low speed.

10. The apparatus of claim 8, wherein the filtered signal obtained from said low pass filter unit corresponds to a focus control signal for focusing adjustment in the optical storage system and filtered to remove a high-frequency component thereof.

11. The apparatus of claim 8, wherein said low pass filter unit includes:
   a first low pass filter for processing the focus output signal to result in a focus control signal suitable for focusing adjustment in the optical storage system; and
   a second low pass filter coupled to said first low pass filter and said direct current level remover, said second low pass filter removing a high-frequency component of the focus control signal to obtain the filtered signal.

12. The apparatus of claim 11, wherein said second low pass filter has a cut-off frequency that is dependent upon rotation speed of a spindle motor of the optical storage system.

13. The apparatus of claim 8, wherein said speed controller deems the optical disc to be a warped disc when the amplitude of the warp-indicating signal is larger than the predetermined threshold value, and controls the optical storage system so as to limit the maximum rotation speed of the optical disc when said speed controller deems the optical disc to be a warped disc.

14. The apparatus of claim 8, wherein the predetermined threshold value is obtained from said focus controller, said low pass filter unit and said direct current level remover using a reference optical disc having a predetermined extent of warping.

15. The apparatus of claim 8, wherein said focus controller and said speed controller are implemented in a single digital signal processor.

16. The apparatus of claim 8, wherein said focus controller, said low pass filter unit, said direct current level remover, and said speed controller are implemented in a single digital signal processor.

* * * * *